(12) United States Patent
Esterberg et al.

(10) Patent No.: US 7,245,213 B1
(45) Date of Patent: Jul. 17, 2007

(54) RFID READERS AND RFID TAGS EXCHANGING ENCRYPTED PASSWORD

(75) Inventors: Aanand Esterberg, Seattle, WA (US); Christopher J. Diorio, Shoreline, WA (US); Todd E. Humes, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 192 days.

(21) Appl. No.: 11/033,028

(22) Filed: Jan. 10, 2005

Related U.S. Application Data

(60) Provisional application No. 60/610,808, filed on Sep. 17, 2004, provisional application No. 60/574,359, filed on May 24, 2004.

(51) Int. Cl.
  *G08B 1/08* (2006.01)
  *G08B 13/14* (2006.01)
  *H04Q 5/22* (2006.01)

(52) U.S. Cl. .............. 340/539.12; 340/572.1; 340/572.7; 340/5.85; 340/10.3; 235/382

(58) Field of Classification Search ............ 340/539.12
See application file for complete search history.

(56) References Cited

U.S. PATENT DOCUMENTS 6,454,605 B1 * 9/2002 Bassler et al. ............ 340/572.1

* cited by examiner

*Primary Examiner*—Donnie L. Crosland
(74) *Attorney, Agent, or Firm*—Merchant & Gould; Greg Kavounas; Carl K. Turk

(57) ABSTRACT

RFID system components, such as readers and tags, communicate where at least a portion of data or a password is transmitted in encrypted form. The reader transmits a command, along with data or a password encrypted using an encryption kernel. In some instances, the tag itself has sent the kernel.

60 Claims, 13 Drawing Sheets

RFID TAG

SIGNAL PATH DURING R→T

SIGNAL PATH DURING T→R

*RFID SYSTEM*

*[TAG-K SINGULATED]*

RFID SYSTEM
[TAG-K SINGULATED]

ROGUE READER EAVESDROPS ON
LEGITIMATE READER BUT NOT TAGS

RFID READERS AND RFID TAGS
EXCHANGING ENCRYPTED PASSWORD

RELATED APPLICATIONS

This application claims the benefit of U.S. Provisional Applications Ser. No. 60/610,808 filed on Sep. 17, 2004 and Ser. No. 60/574,359 filed on May 24, 2004, which is hereby claimed under 35 U.S.C. § 119(e). Both Provisional Applications are incorporated herein by reference.

FIELD OF THE INVENTION

The present invention relates to Radio Frequency IDentification (RFID) systems and components, more particularly, to RFID readers, RFID tags, and methods of exchanging an encrypted data or a password.

BACKGROUND OF THE INVENTION

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier 10 RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags.

SUMMARY

The invention facilitates communication between RFID system components. Accordingly, the invention provides RFID readers, RFID tags, and methods for their communication where at least a portion of a password is transmitted in encrypted form.

According to some embodiments, an RFID reader transmits a command to access the tag. In addition, the reader transmits a callout that encrypts at least a portion of data or a password, using an encryption kernel. This way, the data or the password are not transmitted un-encrypted in the open, which provides for better security from another, rogue reader that could be eavesdropping.

In some of those embodiments, the RFID reader receives the kernel from the RFID tag itself. This way, the encryption itself is better protected, if a rogue reader is not close enough to eavesdrop on the tags.

According to some embodiments, an RFID tag receives a command and a callout. The tag then decrypts the callout, to derive data or a password, using an encryption kernel. The tag may even not perform an action in conformance with the command, unless a decrypted password is proper. In some of those embodiments, the RFID tag itself transmits the kernel.

BRIEF DESCRIPTION OF THE DRAWINGS

Non-limiting and non-exhaustive embodiments are described with reference to the following drawings.

Figure 1:
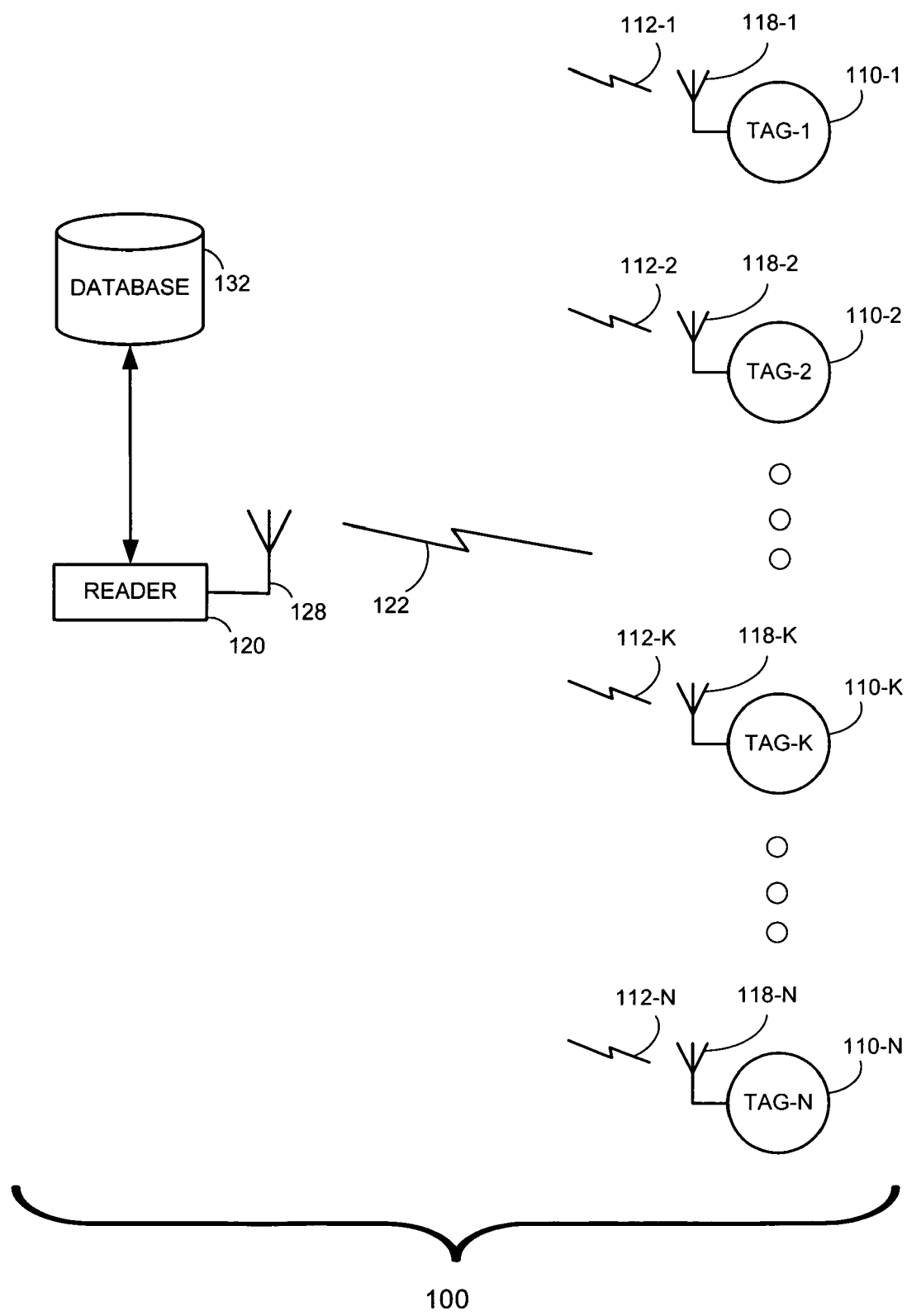
FIG. 1 illustrates a typical RFID system with an RFID reader and a plurality of RFID tags.

DETAILED DESCRIPTION OF THE
PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal. The terms "RFID reader" and "RFID tag" are used interchangeably throughout the text and claims with the terms "reader" and "tag".

FIG. 1 is a diagram of a typical RFID system 100, incorporating aspects of the invention. System 100 includes an RFID reader 120 and N RFID tags 110-1, 110-2, ..., 110-K, ..., 110-N in the vicinity of each other and of reader 120.

RFID reader 120 has an antenna 128, and is in communication with database 132. Reader 120 transmits an interrogating Radio Frequency (RF) wave 122, which can be perceived by tags 110-1, 110-2, ..., 110-K, ..., 110-N.

RFID tags 110-X (X here stands for 1, 2, ..., K, ..., N) can be passive tags or active tags, i.e. having their own power source. Where tags 110-X are passive tags, they are powered from wave 122.

Each tag 110-X includes an antenna 118-X. Upon sensing interrogating RF wave 122, each tag 110-X may generate a wave 112-X in response. RFID reader 120 senses and interprets waves 112-X.

In FIG. 1, as in other FIGURES, interrogating RF wave 122 is shown as larger than waves 112-X. This is to signify that interrogating RF wave 122 has a higher intensity, and thus my be overheard by an eavesdropping rogue reader, a fact that will become more significant from the below.

Reader 120 and tag 110-X thus exchange data via waves 122 and 112-X. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, a symbol 0, a symbol 1, and so on. Further symbols can be implemented for ultimately exchanging binary data, such as "0" and "1", if that is desired.

In addition, groups of these bits and/or symbols are named according to their function. For example, it is customary to refer to such groups as are "commands", "data", "payload", "handle", "kernel", and so on.

Figure 2:
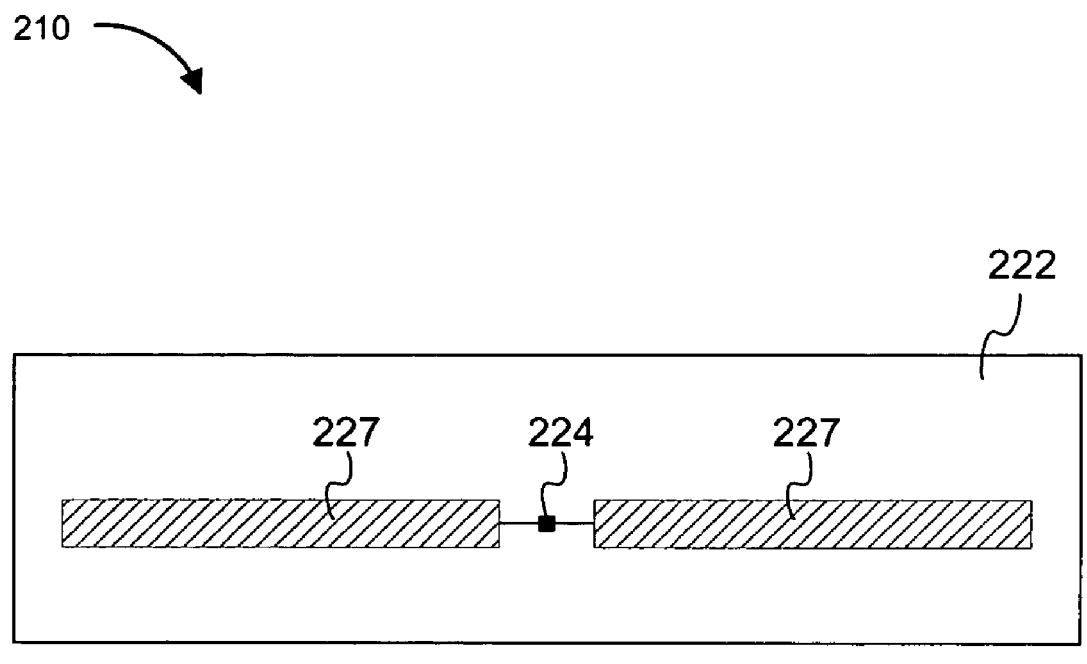
FIG. 2 is a diagram of an RFID tag such as one of the RFID tags shown in FIG. 1.

FIG. 2 is a diagram of RFID tag 210, which can be any one of tags 110-X. Tag 210 is implemented as a passive tag, meaning it does not have its own power source. Much of what is described in this document, however, applies also to active tags.

Tag 210 is formed on substantially planar inlay 222, which can be made in many ways known in the art. Tag 210 also includes two antenna segments 227, which are usually flat and attached to inlay 222. Antenna segments 227 are shown here forming a dipole, but many other embodiments using any number of antenna segments are possible.

Tag 210 also includes an electrical circuit, which is preferably implemented in integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
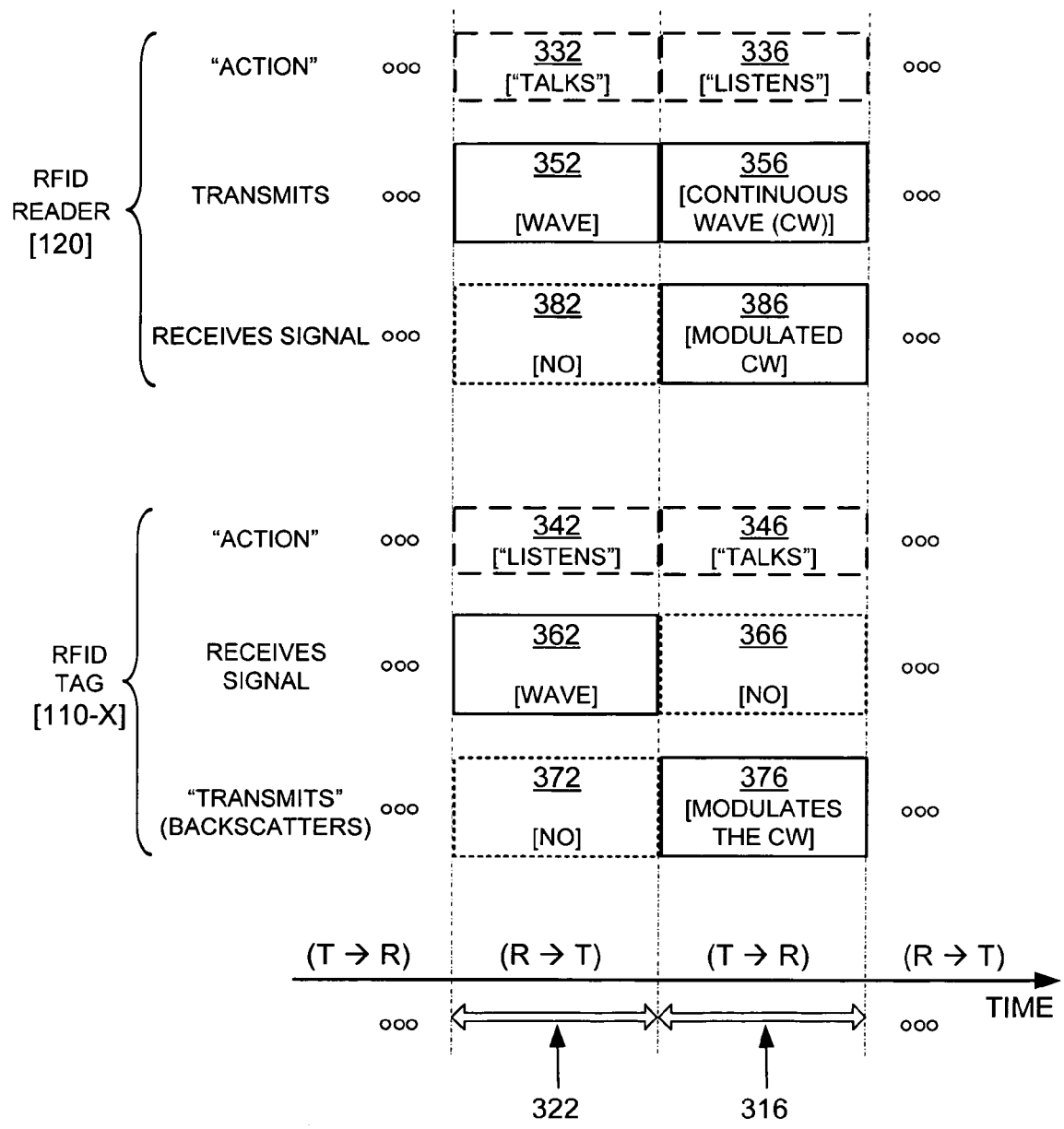
FIG. 3 is a conceptual diagram for explaining a half-duplex mode of communication between the components of the RFID system of FIG. 1, during normal operation in the field.

FIG. 3 is a conceptual diagram 300 for explaining the half-duplex mode of communication between the components of the RFID system of FIG. 1, especially when tags 110-X are implemented as shown for passive tag 210 of FIG. 2. The explanation is made with reference to a TIME axis, and also to a human metaphor of "talking" and "listening". The actual technical implementations for "talking" and "listening" are now described.

RFID reader 120 and RFID tags 110-X talk and listen to each other by taking turns. As seen on axis TIME, when reader 120 talks to one or more of tags 110-X, the session is designated as "R→T", and when tags 110-X talk to reader 120 the session is designated as "T→R". Along the TIME axis, a sample R→T session occurs during a time interval 322, and a following sample T→R session occurs during a time interval 316. Of course intervals 322, 316 can be of different durations—here the durations are shown approximately equal only for purposes of illustration.

According to blocks 332 and 336, RFID reader 120 talks during interval 322, and listens during interval 316. According to blocks 342 and 346, one or more of RFID tags 110-X listen while reader 120 talks (during interval 322), and talk while reader 120 listens (during interval 316).

In terms of actual technical behavior, during interval 322, reader 120 talks to tags 110-X as follows. According to block 352, reader 120 transmits wave 122, which was first described in FIG. 1. At the same time, according to block 362, tags 110-X receive wave 122 and process it. Meanwhile, according to block 372, tags 110-X do not backscatter with their antennas 118-X, and according to block 382, reader 120 has no wave to receive from tags 110-X.

During interval 316, one or more tags 110-X talk to reader 120 as follows. According to block 356, reader 120 transmits a Continuous Wave (CW), which can be thought of as a carrier signal that ideally encodes no information. As discussed before, this carrier signal serves both to be harvested by tags 110-X for their own internal power needs, and also as a wave that tags 110-X can backscatter. Indeed, during interval 316, according to block 366, tags 110-X do not receive a signal for processing. Instead, according to block 376, tags 110-X modulate the CW emitted according to block 356, so as to generate backscatter waves 112-X. Concurrently, according to block 386, reader 120 receives backscatter waves 112-X and processes them.

Backscatter waves 112-X may be many at once. As will be seen later in this document, reader 120 may limit tags 110-X to where fewer of them talk, or even just one.

Figure 4:
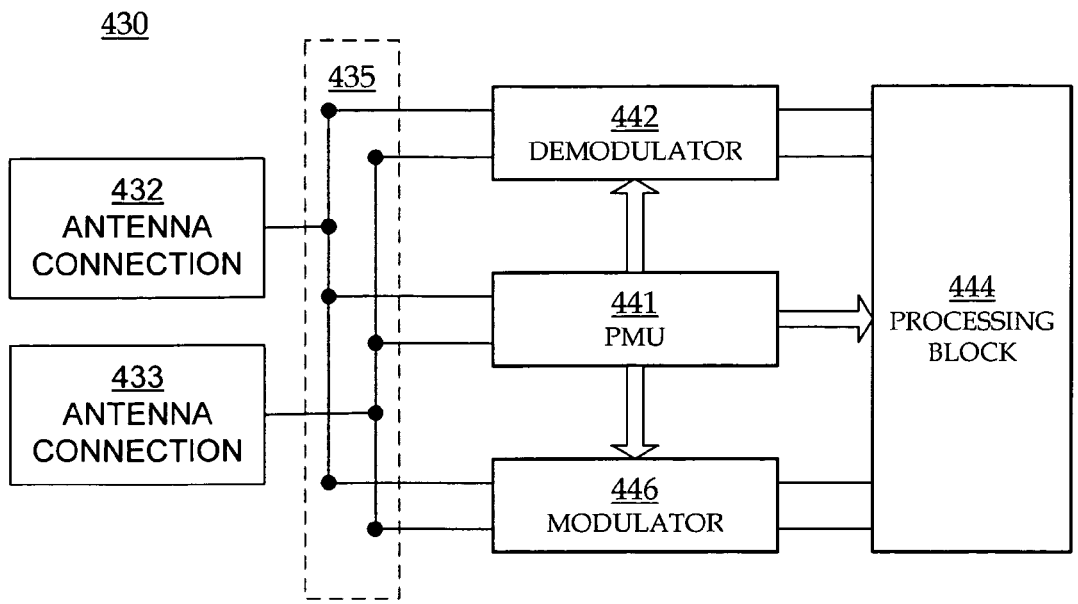
FIG. 4 is a block diagram illustrating one embodiment of an electrical circuit that may be employed in an RFID tag such as the RFID tags of FIG. 1.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to antenna segments (not shown in FIG. 4). Antenna connections 432, 433 may be made in any suitable way, such as pads and so on. In a number of embodiments more antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on. In addition, in some embodiments, processing block 444 may be considered to include other blocks, including some of those shown as separate. For example, processing block 444 may be considered to be parsing the signal received via the antenna, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

For both a reader and a tag, transmission is by circuitry therefore modulating a wave that is transmitted. Reception is by parsing bits out of a wave received by the antenna.

In terms of processing a signal, circuit 430 operates differently during a R→T session and a T→R session. The treatment of a signal is described below.

Figure 5A:
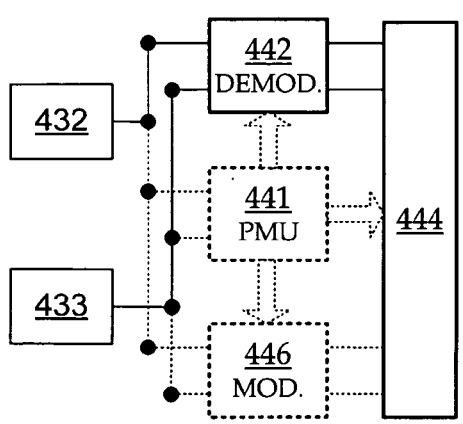
FIGS. 5A and 5B illustrate two versions of the electrical circuit of FIG. 4 emphasizing signal flow in receive and transmit operational modes of the RFID tag, respectively.

FIG. 5A shows version 530-A of circuit 430 of FIG. 4. Version 530-A shows the components of circuit 430 for a tag, further modified to emphasize a signal operation during a R→T session (receive mode of operation) during time interval 322 of FIG. 3. An RF wave is received from antenna connections 432, 433, a signal is demodulated from demodulator 442, and then input to processing block 444. In one embodiment according to the present invention, what is input to processing block 444 may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
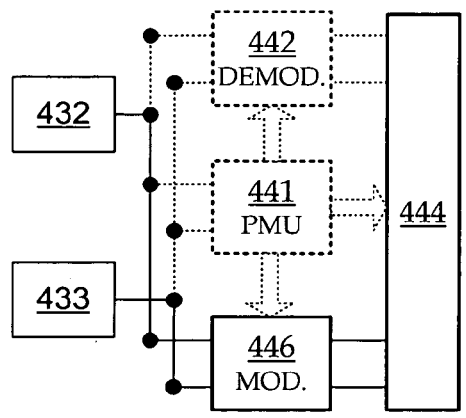

FIG. 5B shows version 530-B of circuit 430 of FIG. 4. Version 530-B shows the components of circuit 430 for a tag, further modified to emphasize a signal operation during a T→R session during time interval 316 of FIG. 3. A signal is output from processing block 444, which can be a transmission stream of symbols. The signal output from processing block 444 is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
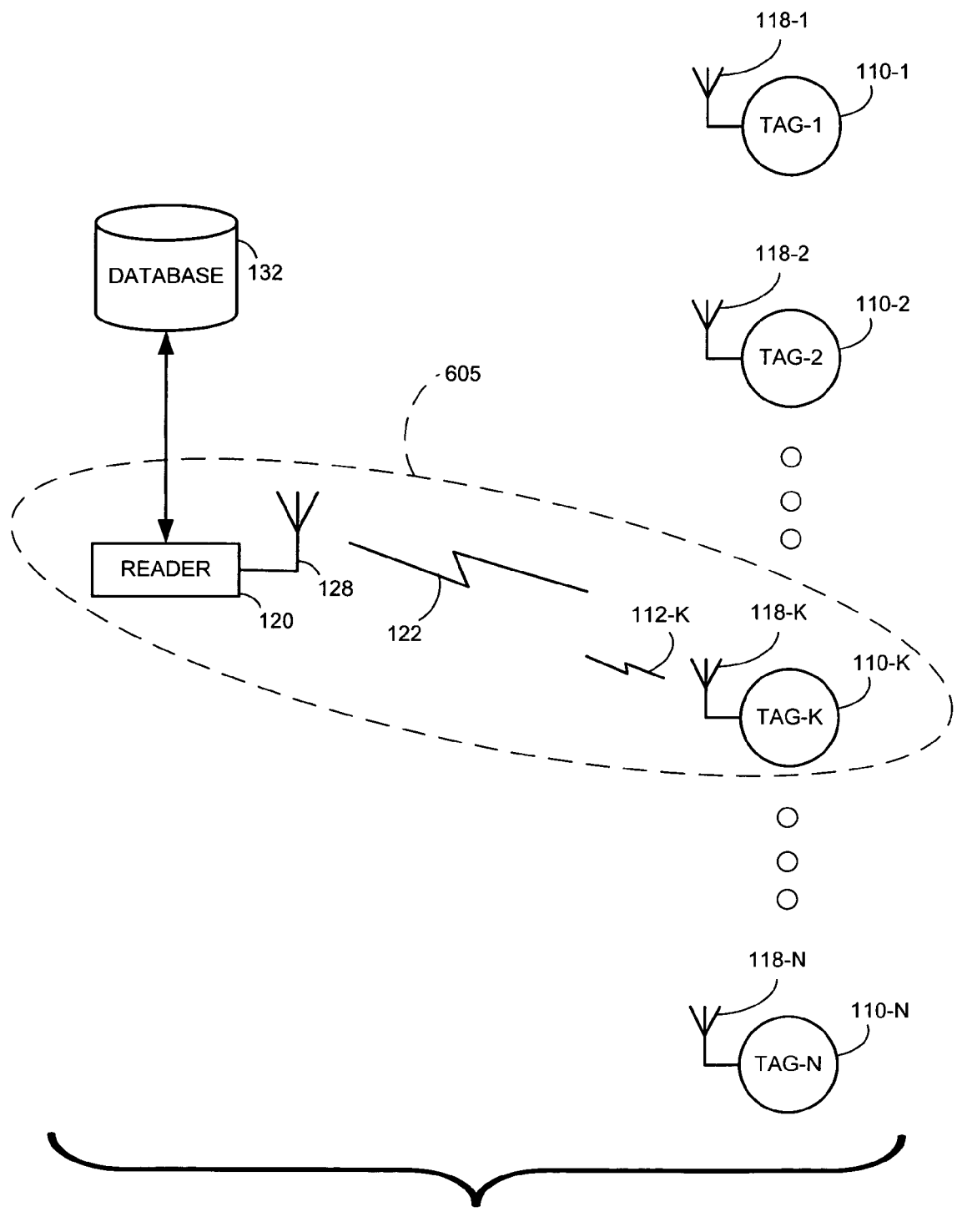
FIG. 6 illustrates the RFID system of FIG. 1, where further one of the tags has been singulated.

FIG. 6 illustrates the RFID system 100, which was first presented in FIG. 1. In addition, RFID tag 110-K has been singulated by reader 120, as shown by relationship 605. This singulation has caused all tags 110-X except tag 110-K to not transmit, so that reader 120 and singulated tag 110-K can exchange data without interference.

Reader 120 has accomplished singulation by first issuing appropriate commands, which have caused tags 110-X to transition to appropriate internal states. In this example, at least tag-K 110-K is in a state where it can receive an access-type command, while the remaining tags are in states where generally they do not respond or take action, until reader 120 and singulated tag 110-K complete their exchanges.

The term singulation, as used for the present document, generally means a process for distinguishing a tag from other tags. As such, singulation may be unnecessary when a single reader is addressing a single tag, or where there is no interference from, or concern about any other RFID components such as other RFID tags. The term singulation, as used here, may by coincidence be functionally the same as a specific term "singulation", which means a process of a reader that can be performed with many or even a single tag.

Figure 7:
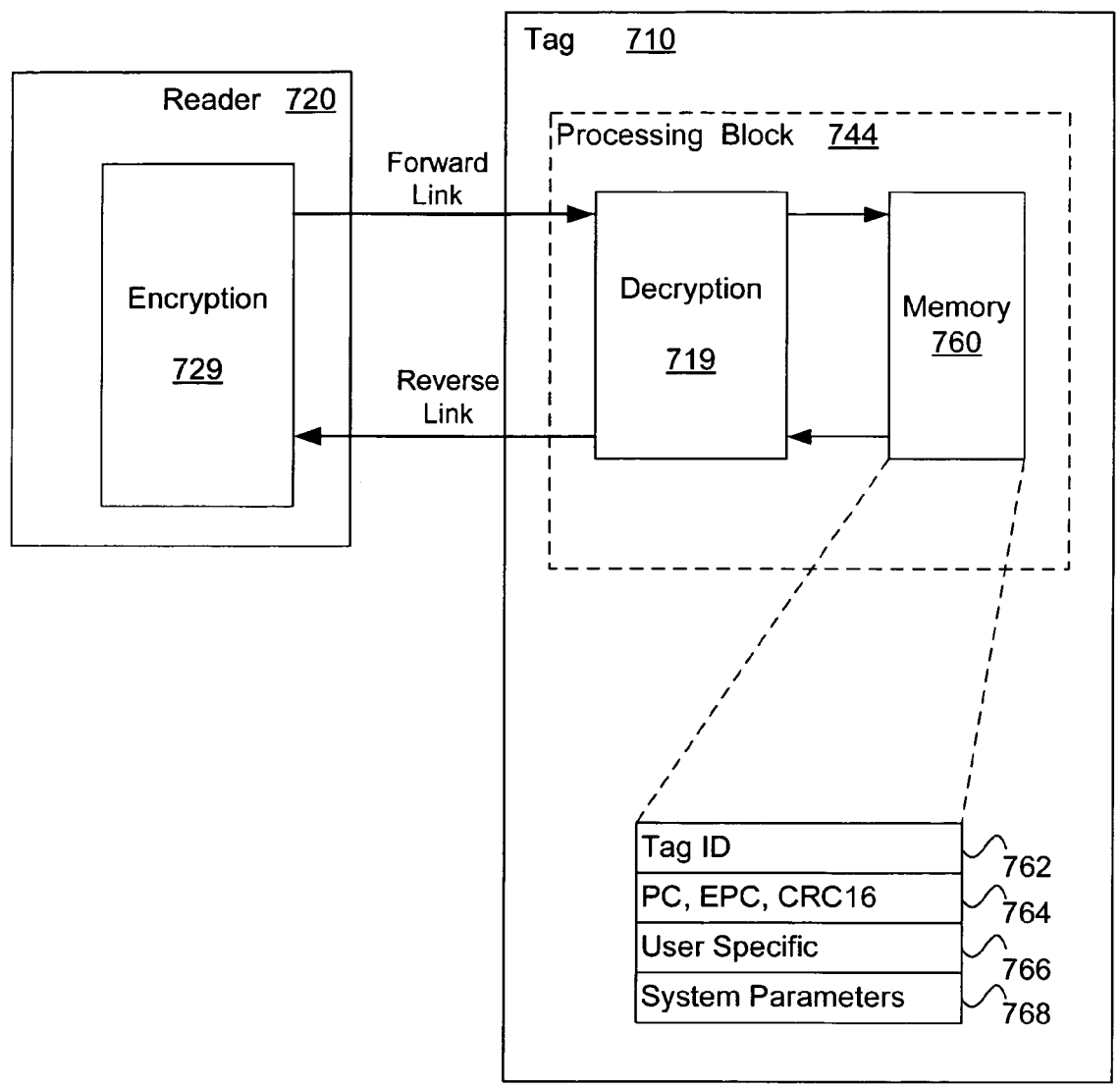
FIG. 7 illustrates functional blocks of the RFID reader and the RFID tag of FIG. 1 that are additionally engaged when the tag is singulated as in FIG. 6.

FIG. 7 illustrates additional functional blocks of an RFID reader 720 and an RFID tag 710, engaged when tag 710 is singulated by reader 720 from other tags (not shown). It will be appreciated that what is said in relation to FIG. 7 can also apply to what is shown in FIG. 6.

Reader 720 includes at least an encryption block 729. Block 729 may be implemented in any number of ways, such as by hardware, software, Application Specific Integrated Circuits (ASICs), standalone or as part of a processor, microprocessors, and so on. It may also be implemented in conjunction with an encryption block.

In the preferred embodiment, block 729 is a logical XOR gate. When thus implemented, block 729 is suitable for XORing something to be encrypted (e.g. a password or a portion of it) with an encryption kernel.

The term encryption is used in this document with its general meaning. In some embodiments, it includes a specific term called "cover coding", and so on.

XORing is the preferred encryption for the invention. That is because a string of binary values encrypted by XORing can be decrypted by passing it through another logical XOR gate, using the same kernel.

In an operation reader 720 receives a kernel from tag 710 via a reverse link. Reader 720 uses the kernel to encrypt a password or a portion of it, and then transmits the encrypted password via a forward link. This way, the password is not transmitted un-encrypted in the open, which provides for better security.

Tag 710 includes a processing block 744, which can be the same as processing block 444 of FIG. 4. In addition, block 744 includes at least a decryption block 719. Block 719 may be implemented in any way known in the art, and also as described above with reference to block 729. Similarly, in the preferred embodiment, decryption is performed by XORing and block 719 is implemented by a logical XOR gate.

Block 744 may also include memory 760. Memory 760 is arranged to store data associated with tag 710. Accordingly, memory 760 may be implemented from one or more nonvolatile memory cells, nonvolatile memory circuits, volatile memory cells, programmable logic arrays (PLAs), latches, registers, EPROMs, EEPROMs, and the like.

The data stored in memory 760 may include identification information associated with tag 710, information associated with an item the tag is attached to, communication parameters such as a password, and the like. Data may be stored in memory 760 during a production stage, or during an operation by processing block 744. Processing block 744 may access memory 760 to store the received command, password, kernel. Processing block 744 may access memory 760 also to change its contents based on the command received from reader 720.

In the embodiment of FIG. 7, memory 760 is partitioned into object identification portion 764, tag identification portion 762 to store information associated with a tag identifier, user specific portion 766 to store user-specified information, and system parameter portion 768 to store at least one system parameter. Object identification portion 764 can be arranged to store, as convenient, a protocol control (PC) parameter, an EPC code, and/or a CRC 16 (cyclic redundancy check).

In operation, tag 710 transmits a kernel to reader 720 via the reverse link. Then if it receives an access type command, it also waits for a callout. Block 719 decrypts the callout using the kernel, and then another component (not shown) validates the decrypted callout against a password. If the password is proper, then an action is taken in accordance with the command. For example, tag 710 may transition to a different state.

Figure 8:
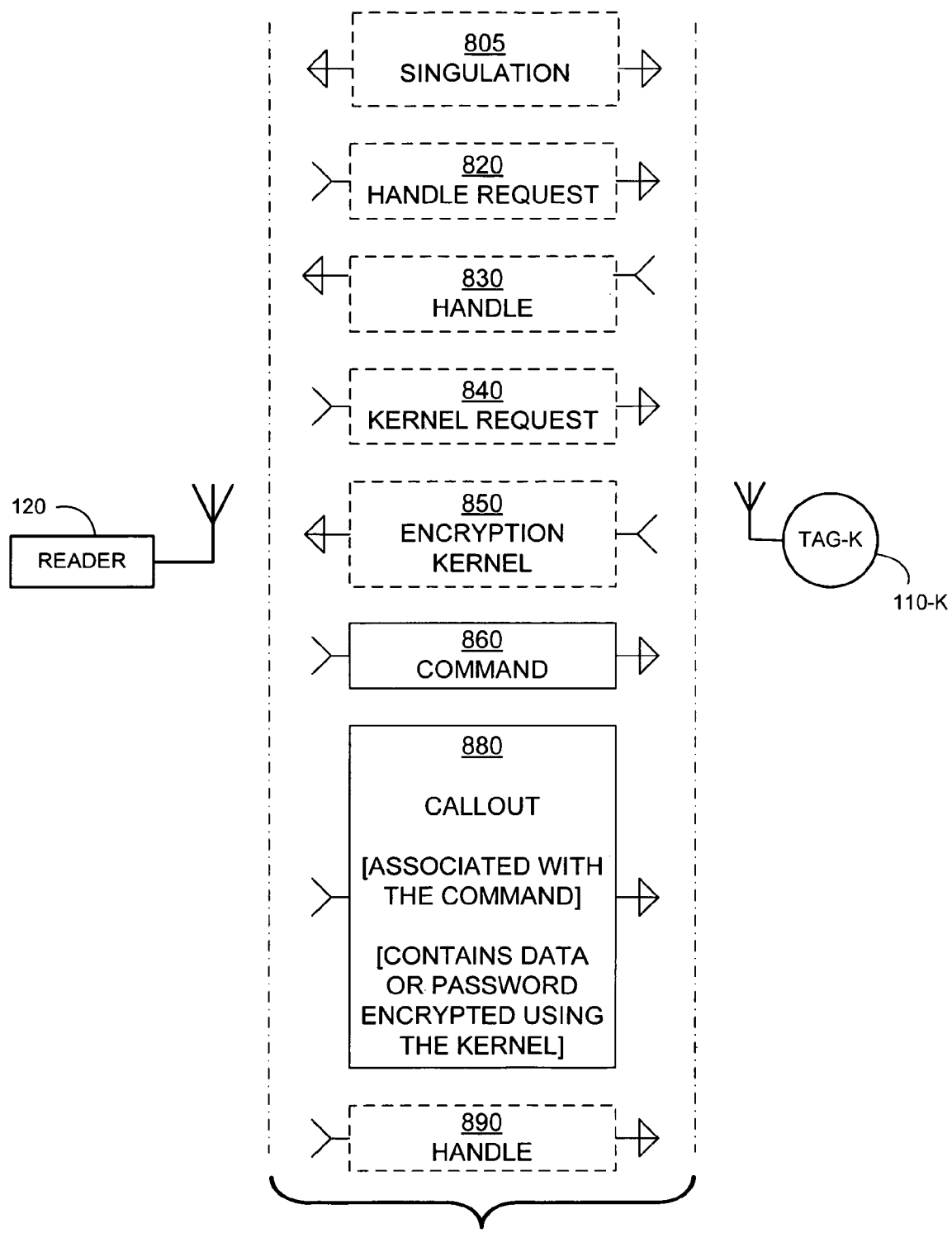
FIG. 8 is a conceptual drawing illustrating contents of exchanges between the RFID reader and the singulated RFID tag of FIG. 6 according to embodiments.

FIG. 8 is a conceptual drawing illustrating a group 800 of contents of exchanges between RFID reader 120 and singulated RFID tag-K 110-K of FIG. 6. The contents are characterized in terms of their function. The exchanges themselves that include the contents may take place in any meaningful order. Physically, they take place as part of a transmission, as will be understood by a person skilled in the art, in view of what has already been described. A transmission may include the whole exchange content, or just parts of it.

Tag singulation is included in an optional mutual exchange content 805, to be performed as per the above. Content 805 is preferred, in the event there are more than one tags that could respond in a way that interferes. Content 805 is not necessary, if there are no other tags in the vicinity, or if there are, but their responses are dealt with otherwise. Content 805 is mutual, in that both reader 120 and tag-K 110-K transmit and receive.

An optional exchange content 820 includes a handle request, and is transmitted from reader 120 to tag-K 110-K. The handle request can be a random-number request.

An optional exchange content 830 includes a handle that is transmitted from tag-K 110-K to reader 120. Content 830 is preferably generated in response to communicating content 820. The handle can be generated by the tag, and can be an identity code, a random number, and so on.

An exchange content 840 includes a kernel request that is transmitted from reader 120 to tag-K 110-K. Content 840 is optional, in the sense that it need not be made explicitly, or even at all (a tag could be always transmitting proposed kernels). The kernel request can be implicit, based on context. As will be seen below, the request can be implied when by convention it is agreed that, after a tag sends identifying data, it receives a request for a random number. In that instance, the random number is to be treated as the kernel.

An optional exchange content 850 includes an encryption kernel that is transmitted from tag-K 110-K to reader 120. This is performed preferably in response to exchange 840. Again this is optional, in that a kernel could be predetermined, as a password. In the preferred embodiment, however, the kernel is received by the reader from the tag.

A distinction is important at this juncture. Both the handle of exchange content 830 and the kernel of exchange content 850 can be random numbers, and even similarly generated. By random number, in this context, is meant a number generated by the tag, and communicated to the reader, and which includes at least a component that has a degree of randomness. The degree of randomness can be true randomness, or pseudo-randomness.

The kernel and the handle, however, are treated differently. The handle, if used, is repeated openly by the reader to differentiate the singulated tag. The kernel is not repeated openly by the reader, lest it be overheard by an eavesdropping rogue reader, as will be described also below.

An exchange content 860 includes a command that is transmitted from reader 120 to tag-K 110-K. The command is preferably an access type command, such as Req_RN (requesting a random number), Read, Write, Kill, Lock, Access, BlockWrite, and BlockErase.

An exchange content 880 includes a callout that is transmitted from reader 120 to tag-K 110-K. The callout is associated with the command of content 860. In addition, the callout contains data or at least a portion of a password that has been encrypted using at least a portion of the kernel of content 830. The password portion is associated with any one or more of the tag, the action and the command.

The callout may be part of a transmission separate from the command of content 860. In the preferred embodiment, however, the command of content 860 includes a payload. All or a portion of the callout is included in the payload. For example, the encrypted payload can be data to be written according to a Write command, or a BlockWrite command.

An optional exchange content 890 includes a handle that is transmitted from reader 120 to tag-K 110-K. It is preferred that the handle of content 890 be the same as the handle of content 830. This can ensure that associated command content 860 and/or callout content 880 are intended for tag-K and not necessarily other tags, if present.

Figure 9:
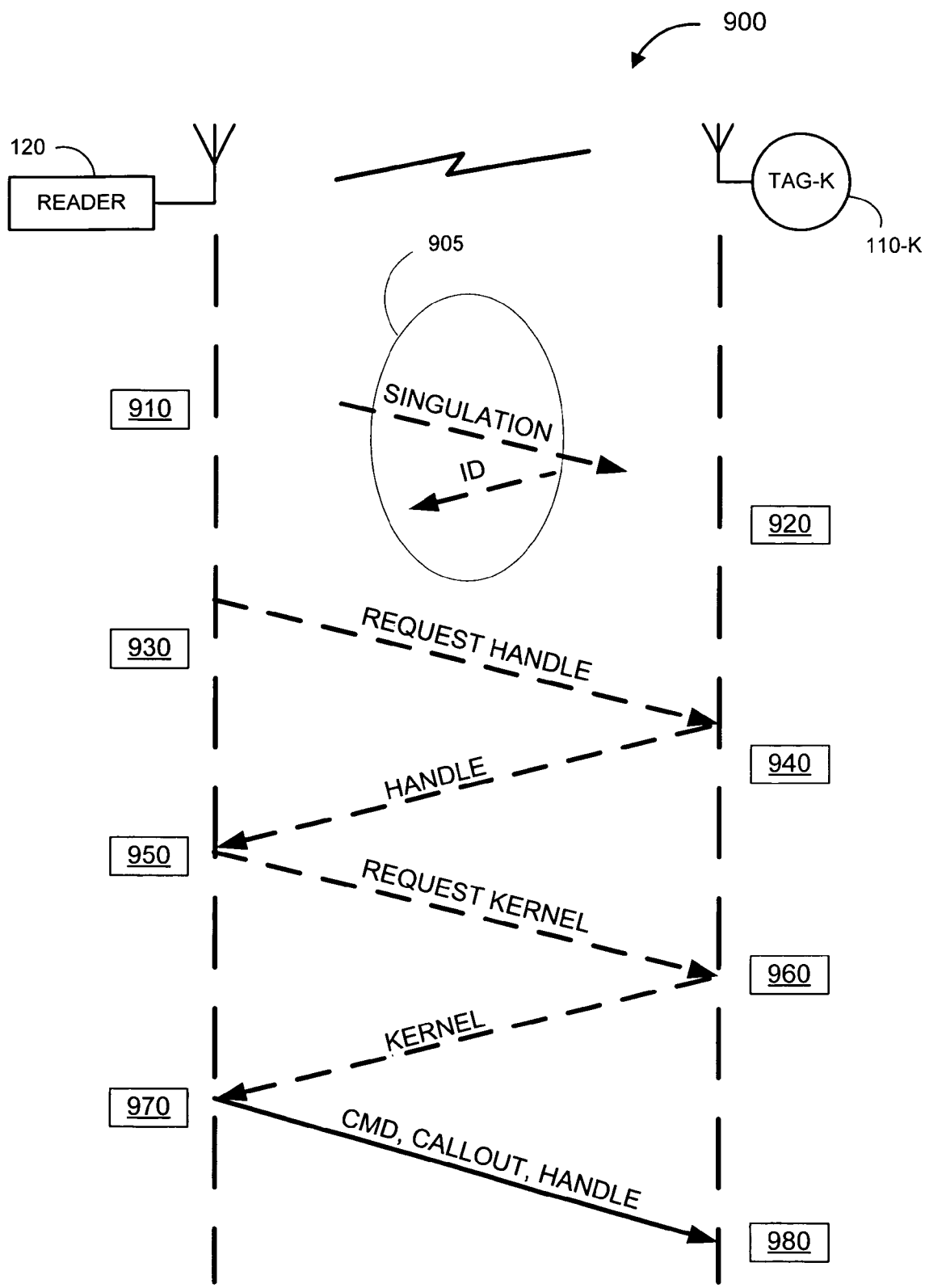
FIG. 9 illustrates a timing diagram of exchanges that can include the contents of FIG. 8 according to embodiments.

FIG. 9 illustrates a timing diagram 900 of exchanges that can include the contents of FIG. 8 according to embodiments. The timing diagram also shows icons of reader 120 and tag-K 110-K.

Between time points 910 and 920, singulation 905 takes place. That is performed as is described elsewhere. As a result, an identity ID of the tag is learned.

Between time points 930 and 940, a handle is optionally requested, as per the above. Between time points 940 and 950, a handle is optionally transmitted, as also per the above. The handle may have been obtained, in some embodiments, as part of singulation 905.

Between time points 950 and 960, a kernel is optionally requested, as per the above. Between time points 960 and 970, a kernel is optionally transmitted, as also per the above.

Between time points 970 and 980, a command is transmitted, along with a callout and a handle, as per the above.

Figure 10:
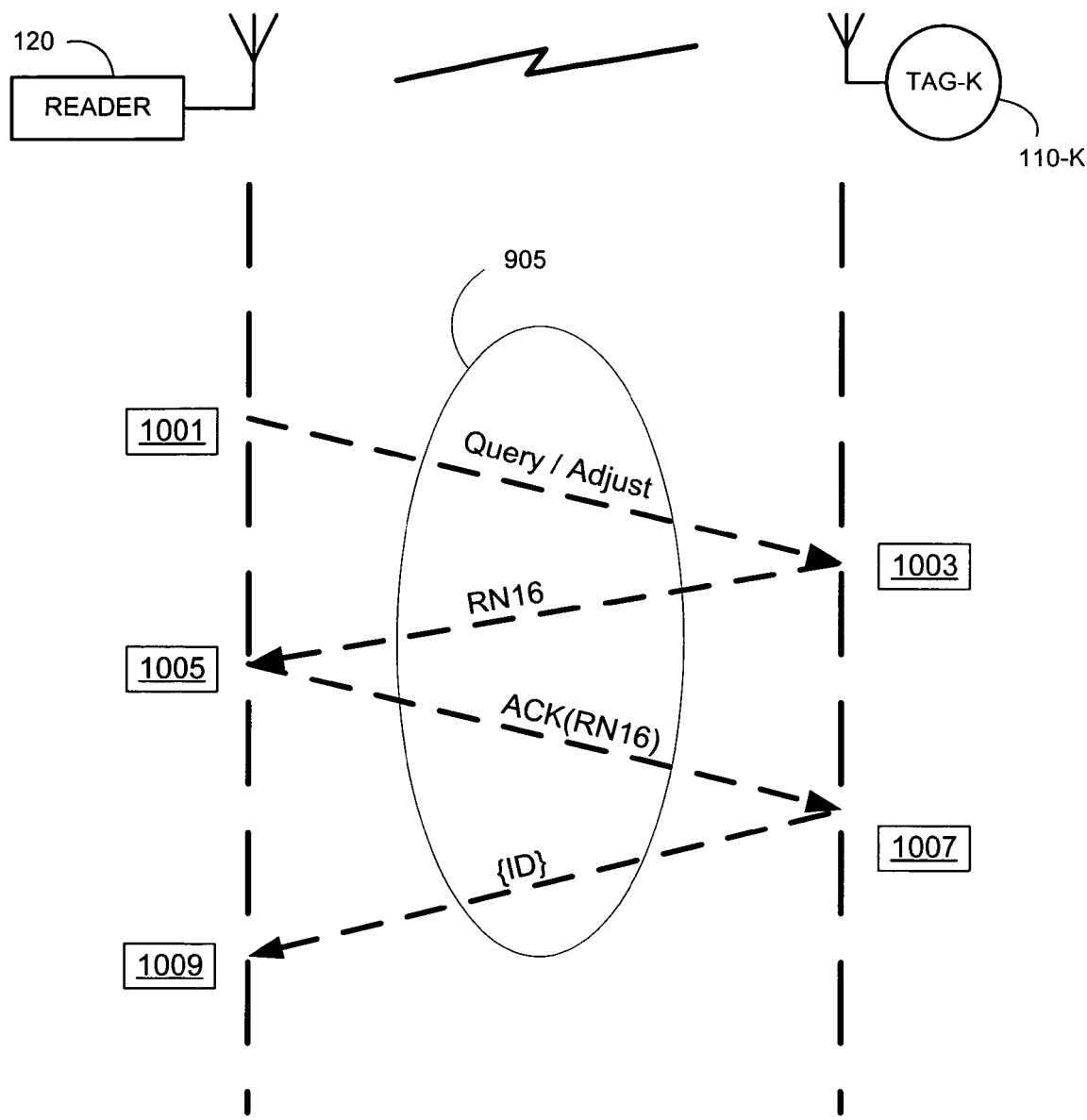
FIG. 10 illustrates a timing diagram of detailed exchanges that can be used to implement a singulation of FIG. 9, according to embodiments.

FIG. 10 illustrates a timing diagram of some detailed exchanges that can be used to implement singulation 905 of FIG. 9. Singulation may, in different contexts use different exchanges than what is shown in FIG. 10.

Between time points 1001 and 1003, a command is transmitted, such as a Query or Adjust command. This can be performed multiple times, if multiple tags are responding.

Between time points 1003 and 1005, tag-K 110-K responds by generating and transmitting a 16-bit random number, such as RN16. This can serve as the handle, so that step might not need to be repeated later.

Between time points 1005 and 1007, reader 120 transmits an acknowledgement. This can take the form of the ACK command, followed by the immediately received RN16.

Between time points 1007 and 1009 tag-K 110-K responds by transmitting its own identifier. The identifier may be the tag's identification code, an identifier associated with an item attached to the tag, and the like.

The singulation process is completed with reader 120 receiving the identifier at time point 1009. At this stage, reader 120 knows which one of many tags it is going to establish secure communications with.

Figure 11:
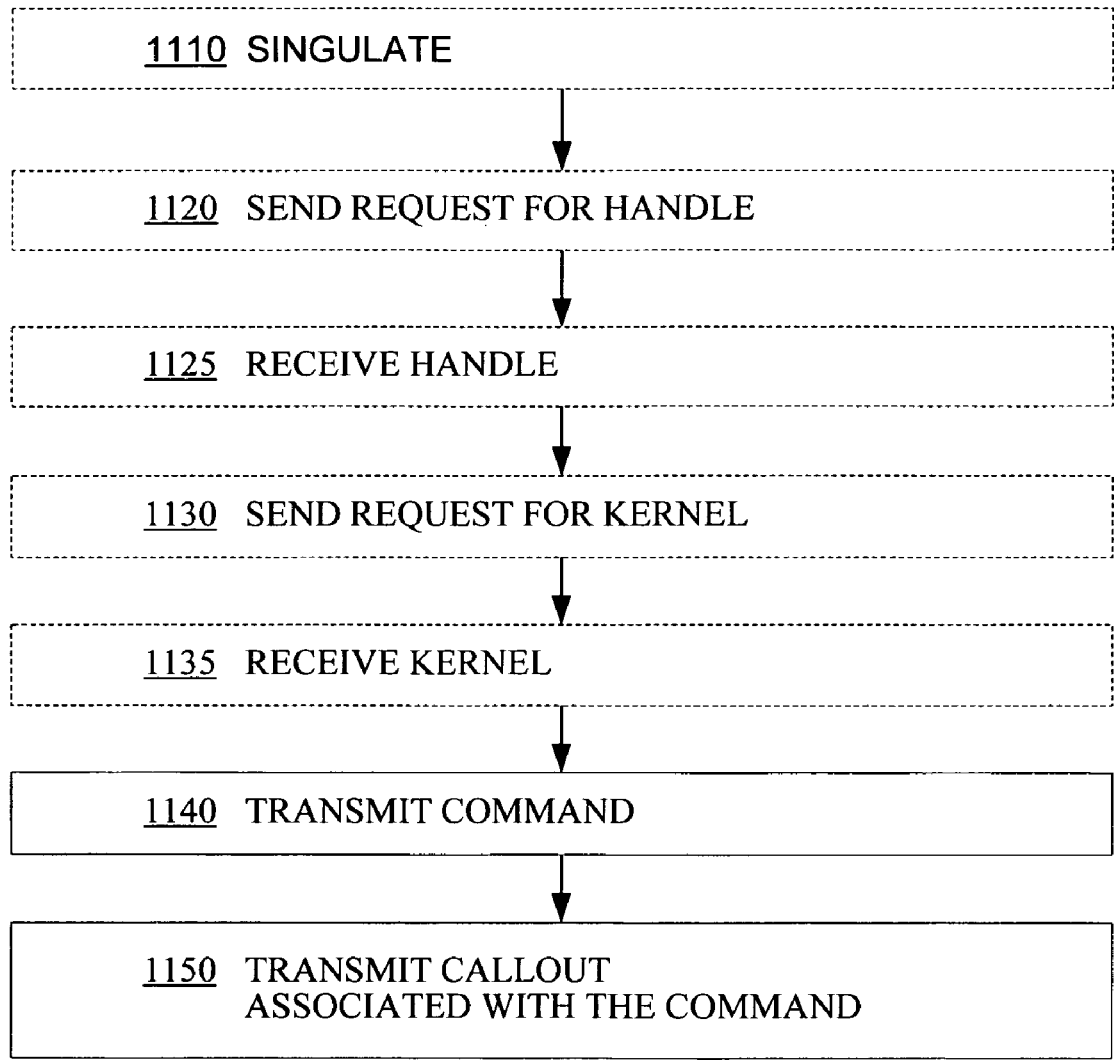
FIG. 11 is a flowchart illustrating a method.

FIG. 11 shows a flowchart 1100 for describing a method. The method of flowchart 1100 may also be practiced by other embodiments described herein, such as reader 120. Many of the individual boxes are performed as described above.

For flowchart 1100, and for other methods of the invention, the reader sends (or transmits) by its circuitry modulating data and/or symbols onto a transmission wave transmitted by the reader. Similarly, the reader receives by parsing a signal received from the antenna, and processed by blocks of the reader such as a processing block.

According to a box 1110, a reader simulates one of many tags. This is performed as described above.

According to an optional next box 1120, the reader sends a request for a handle. According to an optional next box 1125, the reader receives a handle.

According to an optional next box 1130, the reader sends a request for a kernel. According to an optional next box 1135, the reader receives a kernel.

According to a next box 1140, the reader transmits a command. According to an optional next box 1150, the reader transmits a callout associated with the command.

Figure 12:
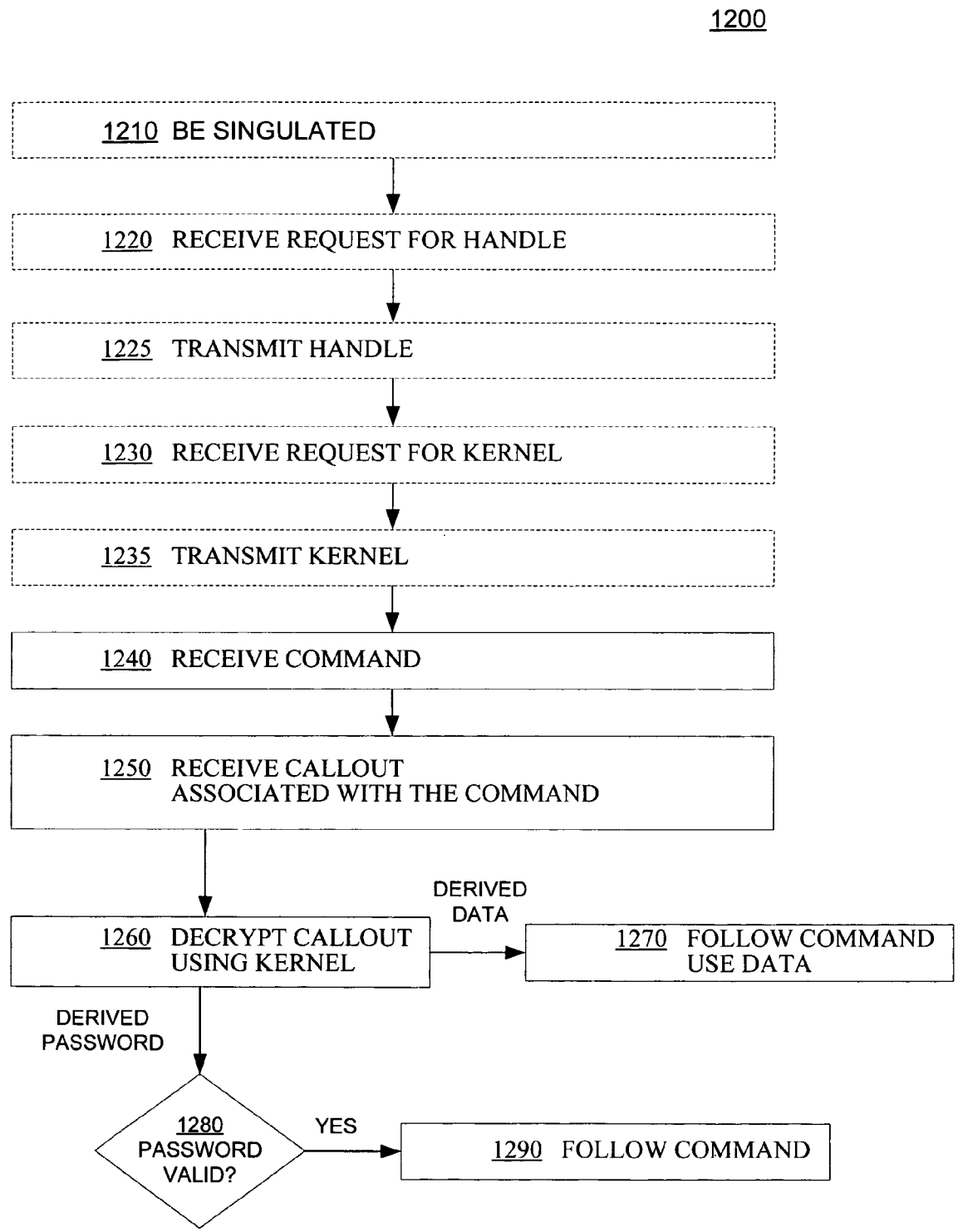
FIG. 12 is a flowchart illustrating another method.

FIG. 12 shows a flowchart 1200 for describing another method. The method of flowchart 1200 may also be practiced by a tag, such as tag-K 110-K that has been singulated. For flowchart 1200, and for other methods of the invention, the tag sends (or transmits) by its circuitry modulating data and/or symbols onto a reflection wave. Similarly, the tag receives by parsing a signal received from the antenna, and processed by blocks of the tag such as a processing block.

According to an optional box 1210, the tag is singulated from other tags.

According to an optional next box 1220, the tag receives a request for a handle. According to an optional next box 1225, the tag sends a handle.

According to an optional next box 1230, the tag receives a request for a kernel. According to an optional next box 1235, the tag sends a kernel.

According to a next box 1240, the tag receives a command. According to a next box 1250, the tag receives a callout associated with the command.

According to a next box 1260, the callout is decrypted using a kernel, such as the kernel sent in box 1235. From the decryption, either data or a password is derived.

If data has been derived at box 1260, then according to a next box 1270, the data is used according to the command. For example, the data may be written into memory according to a Write command.

If a password has been derived at box 1260, then according to a next box 1280, it is determined whether the derived password is valid. If it is, then according to a next box 1290, the command is followed. This means that an action is taken in conformance with the command.

Figure 13:
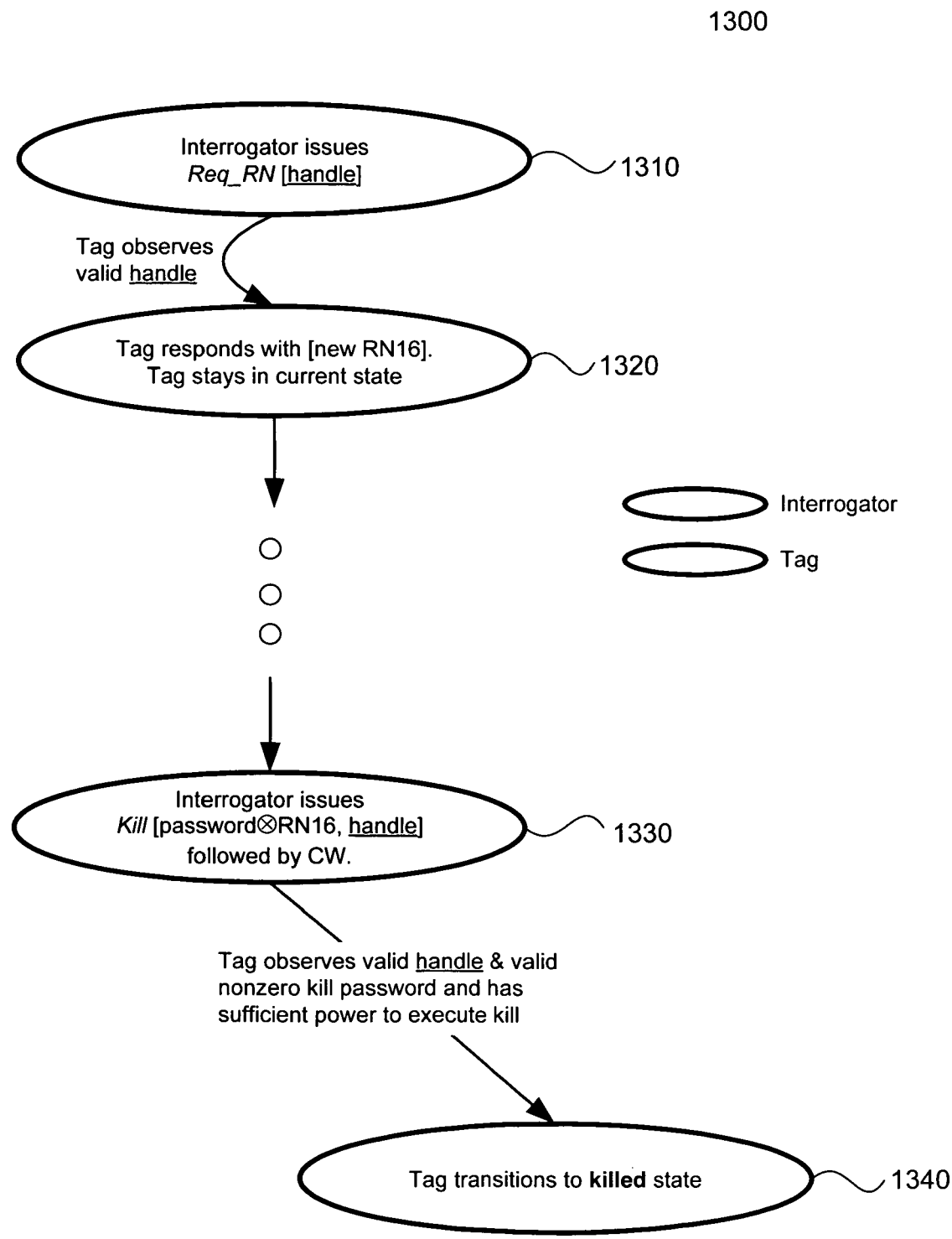
FIG. 13 illustrates a portion of a state diagram for an RFID tag implementing the method of FIG. 12.

FIG. 13 illustrates a portion of a state diagram 1300 for an RFID tag implementing the method of FIG. 12, according to one embodiment. In the embodiment of state diagram 1300, shaded ovals denote reader action, and non-shaded ovals denote tag actions and states.

State diagram 1300, of course, can be part of a larger state diagram for a reader to transmit and a tag to execute a Kill command. Further, it does not include other possibilities, such as what happens if an exchange is not transmitted or received properly, safeguards to ensure such transmissions (e.g. CRC16), additional exchanges so that a kernel and a password are divided into many parts, additional calls to confirm an action, additional ovals that execution might branch to, and so on.

Briefly, state diagram 1300 includes an oval 1310, where an interrogator uses a handle to request a kernel. The kernel will be a random number, and the request is a random-number request, as per the above.

According to a next oval 1320, the tag responds with the kernel requested at oval 1310.

According to a next oval 1330, the reader issues a Kill command. The command has a payload of a proper password that is XORed with the kernel of oval 1320.

According to a next oval 1340, the tag transitions to a killed state.

Figure 14:
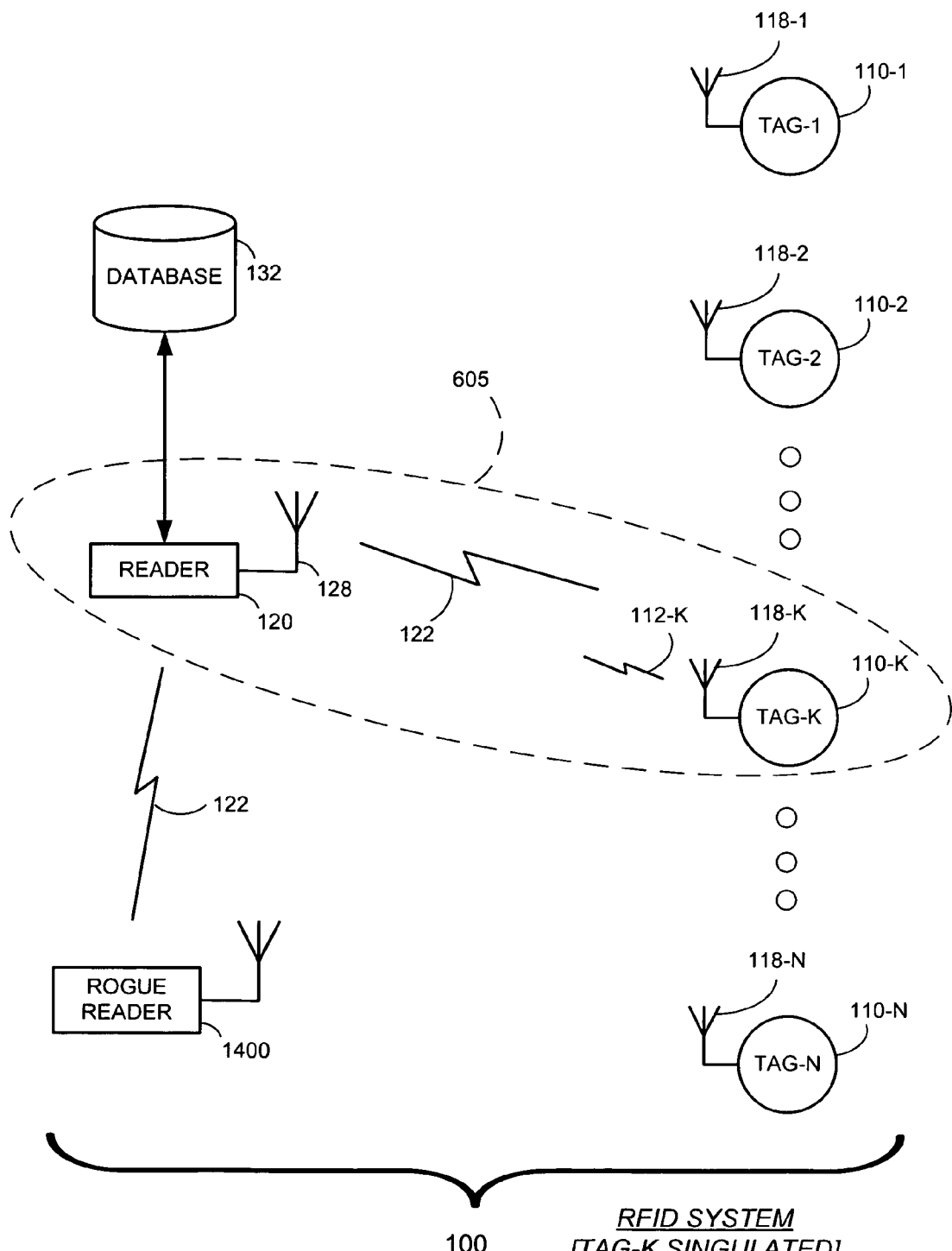
FIG. 14 illustrates a situation where the invention prevents loss of privacy of the tags of FIG. 1 or FIG. 6.

FIG. 14 illustrates a situation where the invention prevents loss of privacy of the tags of FIG. 1 or FIG. 6. A rogue reader 1400 eavesdrops on legitimate reader 120. Reader 120 transmits at high power, because it must also power tags 110-1, 110-2, . . . , 110-K, . . . , 110-N. In this scenario, it is assumed that rogue reader 1400 cannot eavesdrop on tags 110-1, 110-2, . . . , 110-K, . . . , 110-N themselves, as is often the case for secure warehouse environments, and so on.

Rogue reader 1400 will not hear the password of tags 110-1, 110-2,. . . 110-K, . . . , 110-N. That is because it is transmitted at oval 1330, but in an encrypted form, as per the above. This is a particularly good example of the utility of the invention, since it is desired to not let a rogue reader learn how to issue valid Kill commands to one's RFID tags.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A radio frequency identification (RFID) reader, comprising:
an antenna arranged to transmit a transmission wave; and
circuitry arranged to modulate on the transmission wave symbols encoding a tag command and a callout associated with the command, the callout containing data and at least one portion of a preset password, the data and the at least one password portion having been encrypted using a preset kernel.

2. The reader of claim 1, wherein
the command includes a payload, and at least a portion of the callout is included in the payload.

3. The reader of claim 1, wherein
the callout is transmitted in a plurality of portions, and the callout contains the entire password.

4. The reader of claim 1, wherein the circuitry is further arranged to:
determine the password.

5. The reader of claim 1, wherein the circuitry is further arranged to:
determine the password from a database.

6. The reader of claim 1, wherein the circuitry is further arranged to:
encrypt the one of the data and the portion of the password.

7. The reader of claim 1, wherein
encryption is by XORing.

8. The reader of claim 1, wherein
the antenna is further arranged to receive a reception wave, and
the circuitry is further arranged to parse at least a portion of the kernel from the reception wave prior to the callout being transmitted.

9. The reader of claim 8, wherein
the circuitry is further arranged to parse a remaining portion of the kernel from the reception wave.

10. The reader of claim 8, wherein
the circuitry arranged to modulate on the transmission wave symbols encoding a kernel request, and
wherein the kernel portion is received in response to the kernel request.

11. The reader of claim 10, wherein
the kernel request is a random-number request.

12. An RFID component device comprising:
means for transmitting a wireless signal; and
means for modulating onto the signal a tag command, and a callout associated with the command, the callout containing data and at least one portion of a preset password, the data and the at least one password portion having been encrypted using a preset kernel.

13. A method for an RFID reader, comprising:
transmitting a tag command; and
transmitting a callout associated with the command, the callout containing data and at least one portion of a preset password, the data and the at least one password portion having been encrypted using a preset kernel.

14. The method of claim 13, wherein
the command includes a payload, and
at least a portion of the callout is included in the payload.

15. The method of claim 13, wherein
the callout is transmitted in a plurality of portions, and the callout contains the entire password.

16. The method of claim 13, further comprising:
determining the password.

17. The method of claim 13, wherein
the password is determined from a database.

18. The method of claim 13, further comprising:
encrypting the one of the data and the portion of the password.

19. The method of claim 13, wherein
encryption is by XORing.

20. The method of claim 13, further comprising:
receiving at least a portion of the kernel prior to transmitting the callout.

21. The method of claim 20, further comprising:
receiving a remaining portion of the kernel.

22. The method of claim 20, further comprising:
transmitting a kernel request, and
wherein the kernel portion is received in response to the kernel request.

23. The method of claim 22, wherein
the kernel request is a random-number request.

24. The method of claim 22, further comprising:
singulating a tag from a plurality of tags, and
wherein the kernel request is transmitted after singulating.

25. The method of claim 24, further comprising:
transmitting a handle to prevent the other tags from responding to the command.

26. The method of claim 25, further comprising:
receiving the handle.

27. The method of claim 26, further comprising:
requesting the handle.

28. A radio frequency identification (RFID) tag, comprising:
an antenna arranged to receive a wave; and
a processing block arranged to
parse from the wave a command and a callout associated with the command, and
decrypt the callout using at least a portion of a preset encryption kernel to derive one of data and a password.

29. The tag of claim 28, wherein
the processing block is further arranged to
- perform an action that conforms to the command if the decrypted password is in accordance with a preset password.

30. The tag of claim 28, wherein
the processing block is further arranged to
- perform an action that conforms to the command and uses the data, if data has also been derived from the callout.

31. The tag of claim 28, wherein
the command includes a payload, and
at least a portion of the callout is included in the payload.

32. The tag of claim 28, wherein
the callout is received in a plurality of portions, and
the callout contains the entire password.

33. The tag of claim 28, wherein
decrypting is performed by XORing.

34. The tag of claim 28, wherein
the antenna is further arranged to transmit wirelessly a wave that encodes at least one portion of the kernel prior to receiving the callout.

35. The tag of claim 34, wherein
the kernel is a random number.

36. The tag of claim 28, wherein
the processing block is further arranged to further parse a kernel request from the wave, and
wherein the kernel is transmitted in response to the kernel request.

37. An RFID component device comprising:
means for receiving a wireless signal;
means for parsing out of the signal a command;
means for parsing out of the signal a command and a callout associated with the command; and
means for decrypting the callout using at least a portion of a preset encryption kernel to derive one of data and a password.

38. A method for an RFID tag, comprising:
receiving a command;
receiving a callout associated with the command; and
decrypting the callout using at least a portion of a preset encryption kernel to derive one of data and a password.

39. The method of claim 38, further comprising:
performing an action that conforms to the command if the decrypted password is in accordance with a preset password.

40. The method of claim 38, further comprising:
deriving also data from the callout, and
performing an action that conforms to the command and uses the data.

41. The method of claim 38, wherein
the command includes a payload, and
at least a portion of the callout is included in the payload.

42. The method of claim 38, wherein
the callout is received in a plurality of portions, and
the callout contains the entire password.

43. The method of claim 38, wherein
decrypting is performed by XORing.

44. The method of claim 38, further comprising:
transmitting the at least one portion of the kernel prior to receiving the callout.

45. The method of claim 44, further comprising:
transmitting a remainder of the kernel.

46. The method of claim 44, wherein
the kernel is a random number.

47. The method of claim 38, further comprising:
receiving a kernel request, and
wherein the kernel portion is transmitted in response to the kernel request.

48. The method of claim 47, further comprising:
being singulated from a plurality of other tags, and
wherein the kernel request is received after being singulated.

49. The method of claim 48, further comprising:
determining a valid handle, and
wherein the action is performed only if the callout further includes the handle.

50. The method of claim 49, further comprising:
transmitting the handle.

51. The method of claim 50, further comprising:
receiving a request for the handle and
wherein transmitting is performed responsive to receiving the request.

52. A circuit for a radio frequency identification (RFID) tag that includes an antenna arranged to receive a wave, comprising:
circuitry arranged to derive bits from the wave; and
a processing block arranged to:
- parse from the bits a command and a callout associated with the command, and
- decrypt the callout using at least a portion of a preset encryption kernel to derive one of data and a password.

53. The circuit of claim 52, wherein
the processing block is further arranged to:
- perform an action that conforms to the command if the decrypted password is in accordance with a preset password.

54. The circuit of claim 52, wherein
data is also parsed from the bits, and
the processing block is further arranged to perform an action that conforms to the command and uses the data.

55. The circuit of claim 52, wherein
the command includes a payload, and
at least a portion of the callout is included in the payload.

56. The circuit of claim 52, wherein
the callout is received in a plurality of portions, and
the callout contains the entire password.

57. The circuit of claim 52, wherein
decrypting is performed by XORing.

58. The circuit of claim 52, wherein
the antenna is further arranged to transmit wirelessly a wave that encodes at least one portion of the kernel prior to receiving the callout.

59. The circuit of claim 58, wherein
the kernel is a random number.

60. The circuit of claim 52, wherein
the processing block is further arranged to further parse a kernel request from the wave, and
wherein the kernel is transmitted in response to the kernel request.

* * * * *

UNITED STATES PATENT AND TRADEMARK OFFICE
CERTIFICATE OF CORRECTION

PATENT NO.       : 7,245,213 B1                                        Page 1 of 1
APPLICATION NO.  : 11/033028
DATED            : July 17, 2007
INVENTOR(S)      : Esterberg et al.

It is certified that error appears in the above-identified patent and that said Letters Patent is hereby corrected as shown below:

In column 1, line 48, before "RFID" delete "10".

In column 2, line 30, delete "SB" and insert -- 5B --, therefor.

In column 3, line 38, delete "my" and insert -- may --, therefor.

In column 11, line 19, after "110-2,. . ." insert -- , --.

Signed and Sealed this

Eighth Day of April, 2008

JON W. DUDAS
*Director of the United States Patent and Trademark Office*